(12) United States Patent
Pillichshammer et al.

(10) Patent No.: US 10,821,408 B2
(45) Date of Patent: Nov. 3, 2020

(54) HIGH-CONCENTRATION MIXER FOR PRODUCING A CELLULOSE SUSPENSION HAVING A HIGH CELLULOSE CONCENTRATION

(71) Applicant: LENZING AKTIENGESELLSCHAFT, Lenzing (AT)

(72) Inventors: Johann Pillichshammer, Frankenmarkt (AT); Christoph Schrempf, Bad Schallerbach (AT); Michael Maier, Frankenmarkt (AT); Gerhard Malzner, Lenzing (AT)

(73) Assignee: LENZING AKTIENGESELLSCHAFT, Lenzing (AT)

( * ) Notice: Subject to any disclaimer, the term of this patent is extended or adjusted under 35 U.S.C. 154(b) by 0 days.

(21) Appl. No.: 15/771,536

(22) PCT Filed: Oct. 4, 2016

(86) PCT No.: PCT/AT2016/050259
§ 371 (c)(1),
(2) Date: Apr. 27, 2018

(87) PCT Pub. No.: WO2017/070720
PCT Pub. Date: May 4, 2017

(65) Prior Publication Data
US 2018/0345234 A1    Dec. 6, 2018

(30) Foreign Application Priority Data

Oct. 30, 2015  (AT) .............................. A 50923/2015

(51) Int. Cl.
*B01F 7/24* (2006.01)
*B01F 7/00* (2006.01)
(Continued)

(52) U.S. Cl.
CPC ............ *B01F 7/245* (2013.01); *B01F 3/1221* (2013.01); *B01F 7/00208* (2013.01);
(Continued)

(58) Field of Classification Search
CPC ....................................................... B01F 7/245
(Continued)

(56) References Cited

U.S. PATENT DOCUMENTS

| 1,183,885 | A | * | 5/1916 | Landis | ................... | A47J 43/046 |
| | | | | | | 366/314 |
| 1,637,678 | A | * | 8/1927 | Camilla | ..................... | B02B 3/06 |
| | | | | | | 99/611 |

(Continued)

FOREIGN PATENT DOCUMENTS

| DE | 2917814 A1 | 11/1980 |
| DE | 19723325 C | 1/1999 |

(Continued)

*Primary Examiner* — David L Sorkin
(74) *Attorney, Agent, or Firm* — Venable LLP

(57) ABSTRACT

The invention relates to a high-concentration mixer (1) for producing a suspension (2), comprising a stationary container (3) and an agitator (8) arranged in the container axis (7), which agitator is connected to a motor via a flange (9) provided in the region of the container bottom (4), which motor is designed for rotationally driving the agitator (8) for mixing the suspension (2) provided in the container (3), wherein the agitator (8) has helical coils (11) which bring about a vertical downward flow (12) of the suspension (2) in the centre of the container (3) and a vertical upward flow (13) of the suspension (2) in the region of the container wall, wherein the flange (9) comprises at least one blade (15) provided on its circumference, which is designed for wiping the suspension (2) from the container (3) and for supporting the vertical upward flow (13) of the suspension (2) in the region of the container wall.

9 Claims, 1 Drawing Sheet

(51) Int. Cl.
*B01F 15/00* (2006.01)
*B01F 3/12* (2006.01)
*C08B 1/00* (2006.01)
*D21B 1/34* (2006.01)
*D21B 1/02* (2006.01)

(52) U.S. Cl.
CPC ...... *B01F 7/00391* (2013.01); *B01F 7/00616* (2013.01); *B01F 7/00983* (2013.01); *B01F 7/247* (2013.01); *B01F 15/00915* (2013.01); *C08B 1/003* (2013.01); *D21B 1/026* (2013.01); *D21B 1/345* (2013.01); *D21B 1/347* (2013.01); *B01F 2215/0078* (2013.01)

(58) Field of Classification Search
USPC ................. 366/138, 292, 314, 319, 322, 323
See application file for complete search history.

(56) References Cited

U.S. PATENT DOCUMENTS

| | | | | |
|---|---|---|---|---|
| 3,428,261 A | * | 2/1969 | Moulton | D21D 1/32 241/21 |
| 3,946,951 A | * | 3/1976 | Danforth | B02C 18/0092 241/21 |
| 3,997,146 A | * | 12/1976 | Kline | B01F 7/245 366/158.2 |
| 4,460,132 A | | 7/1984 | Thumm et al. | |
| 4,535,943 A | | 8/1985 | Couture | |
| 4,984,900 A | | 1/1991 | Faccia | |
| 5,249,861 A | * | 10/1993 | Thomson | A01J 25/02 366/194 |
| 5,647,665 A | | 7/1997 | Schuler | |
| 2001/0046183 A1 | * | 11/2001 | Lawson | A47J 43/085 366/325.8 |
| 2004/0252583 A1 | * | 12/2004 | Van Der Plas | A01K 5/004 366/314 |
| 2008/0101154 A1 | * | 5/2008 | Huberdeau | A01K 5/004 366/65 |
| 2015/0007952 A1 | | 1/2015 | Moderl et al. | |

FOREIGN PATENT DOCUMENTS

| | | |
|---|---|---|
| DE | 20301539 U1 | 4/2003 |
| EP | 0117716 B1 | 9/1988 |
| EP | 0350754 B1 | 1/1990 |
| EP | 0853642 B1 | 7/1998 |
| WO | 2013/131113 A1 | 9/2013 |
| WO | 2015/132260 A1 | 9/2015 |

\* cited by examiner

HIGH-CONCENTRATION MIXER FOR PRODUCING A CELLULOSE SUSPENSION HAVING A HIGH CELLULOSE CONCENTRATION The present application is a national-stage entry under 35 U.S.C. § 371 of International Patent Application No. PCT/AT2016/050259, published as WO 2017/070720 A1, filed Oct. 4, 2016, which claims priority to Austrian Patent Application No. A 50923/2015, filed Oct. 30, 2015, the entire disclosure of each of which is incorporated by reference herein.

BACKGROUND OF THE INVENTION

Field of the Invention

The invention relates to a high-concentration mixer for producing a homogeneous suspension of cellulose in an aqueous solution of a tertiary amine oxide, comprising a stationary container and an agitator arranged in a container axis, which agitator is connected to a motor via a flange provided in the region of the container bottom, which motor is designed for rotationally driving the agitator for mixing the suspension provided in the container, wherein the agitator has flow breakers which bring about a vertical downward flow of the suspension in the centre of the container and a vertical upward flow of the suspension in the region of the container wall.

Document EP 0 853 642 B1 discloses a method of producing a cellulose suspension, wherein a container comprising an agitator is used for mixing and dissolving pulp in an aqueous solution. As a solvent, N-methylmorpholine-N-oxide (NMMO) is primarily used, into which pulp is placed and which is admixed to the cellulose suspension. According to the teaching of said patent, the container is rotationally driven in one direction for achieving a particularly thorough mixture, and the agitator is rotationally driven in the opposite direction. Furthermore, it is disclosed to provide the agitator outside of the container axis. It has proved to be a disadvantage of this known method that only a relatively small cellulose content is obtained in the cellulose suspension.

Document WO 2013/131113 A1 likewise discloses a method of producing a cellulose suspension, wherein a cellulose suspension with a cellulose content of from 4.0 to 9.0% by weight is obtained in a high-concentration mixer. This cellulose suspension is applied to a double-wire belt press and is squeezed there to a cellulose content of from 9.0 to 15.0% by weight. It has proved to be a disadvantage of this known method that the double-wire belt press is technically complex and consequently is prone to failure and expensive during operation.

Furthermore, a high-concentration mixer is known from the field of papermaking, wherein paper to be recycled is introduced into an aqueous solution for the preparation of a cellulose suspension. Such a mixer has been placed on the market, for example, by the company Vaahto. This mixer comprises an agitator arranged in the container axis and comprising coils and flow breakers symmetrically distributed on the container at the circumference thereof, which bring about a vertical downward flow of the cellulose suspension in the centre of the container and a vertical upward flow of the cellulose suspension in the region of the container wall. It has proved to be a disadvantage of the known mixer that, with a higher cellulose content, scaling may appear in the cellulose suspension between the rotor and the container bottom. The cellulose suspension was no longer circulated and exchanged in this gap, whereby it was compressed strongly and damaged. This led to disruptions in the process and fire hazard due to the emerging frictional heat. The desired high cellulose content in the cellulose suspension was impossible to achieve in this way.

The invention is based on the object of providing a high-concentration mixer for the preparation of a homogeneous suspension of cellulose in an aqueous solution of a tertiary amine oxide, by means of which a cellulose concentration of more than 9.0% by weight can be obtained in the high-concentration mixer.

According to the invention, this object is achieved in that the flange comprises at least one blade provided on its circumference, which is designed for wiping the cellulose suspension from the container and for supporting the vertical upward flow of the cellulose suspension in the region of the container wall, and that a spacer is provided between the container bottom and the flange, which spacer ensures a gap of a substantially consistent width between the container bottom and the flange.

The invention is based on the finding that an increased pressure is generated in the cellulose suspension by the rotor in the region of the container bottom, the increased pressure contributing to the flow of the cellulose suspension from the lower central region of the container to the lower peripheral region of the container and from there along the container wall vertically upwards in the container. However, in mixers according to the prior art and with cellulose concentrations of more than, e.g., 9% by weight, the increased pressure in the lower region of the container causes the relatively viscous cellulose suspension to be pressed into the gap between the flange and the container bottom and the suspension to be damaged therein, whereby the vertical flow along the container comes to a standstill. This effect is counteracted by providing, according to the invention, blades on the circumference of the flange, whereby the high-concentration mixer is rendered suitable also for the production of a cellulose suspension in an aqueous NMMO solution having a cellulose concentration of more than 9% by weight and up to 15% by weight and more.

As the increased pressure in the cellulose suspension in the lower central region of the container is always highest at the place where the helical coils of the rotor end on the flange, it has turned out to be advantageous to attach the blades to the flange exactly at those positions. In this way, the entry of a relatively viscous cellulose suspension into the gap between the flange and the container bottom is prevented particularly effectively, and the existing pressure energy is converted into a vertical upward flow on the container wall.

By providing a spacer between the flange and the container bottom, the distance of the flange from the container bottom is widened from a gap to a width which still causes insignificantly small frictional forces on the rotationally driven agitator even if the cellulose suspension is viscous.

According to another exemplary embodiment, the spacer is omitted, but, instead, a flush connection is installed in the container bottom underneath the flange. During operation, an aqueous solution, for example, NMMO, or a suspension is continuously pumped out of the representational container into the gap between the flange and the container bottom, thus making sure that no viscous cellulose suspension will deposit in the gap in a friction-increasing manner. Of course, the technical measures of the spacer and the flush connection in the container bottom can also be combined in order to be able to intermix particularly high cellulose concentrations.

It has proved to be advantageous to provide prongs or ripper teeth at the free peripheral edge of the helical coil for tearing up the pulp parts. In this way, a particularly high cellulose concentration can be achieved within a short period of time.

By providing a scraper at the end of the agitator which is opposite to the flange, the advantage is obtained that pulp parts which might deposit on the agitator above the liquid level of the cellulose suspension during the stirring process are reintroduced into the cellulose suspension.

An auxiliary agitator with a separate motor on the container wall serves for supporting the vertical downward flow of the cellulose suspension in the centre of the container and the vertical upward flow of the cellulose suspension in the region of the container wall and consequently accelerates the mixing process for enriching a high cellulose concentration.

Further advantageous embodiments of the high-concentration mixer according to the invention are illustrated hereinbelow in further detail on the basis of the figures.

Figure 1:
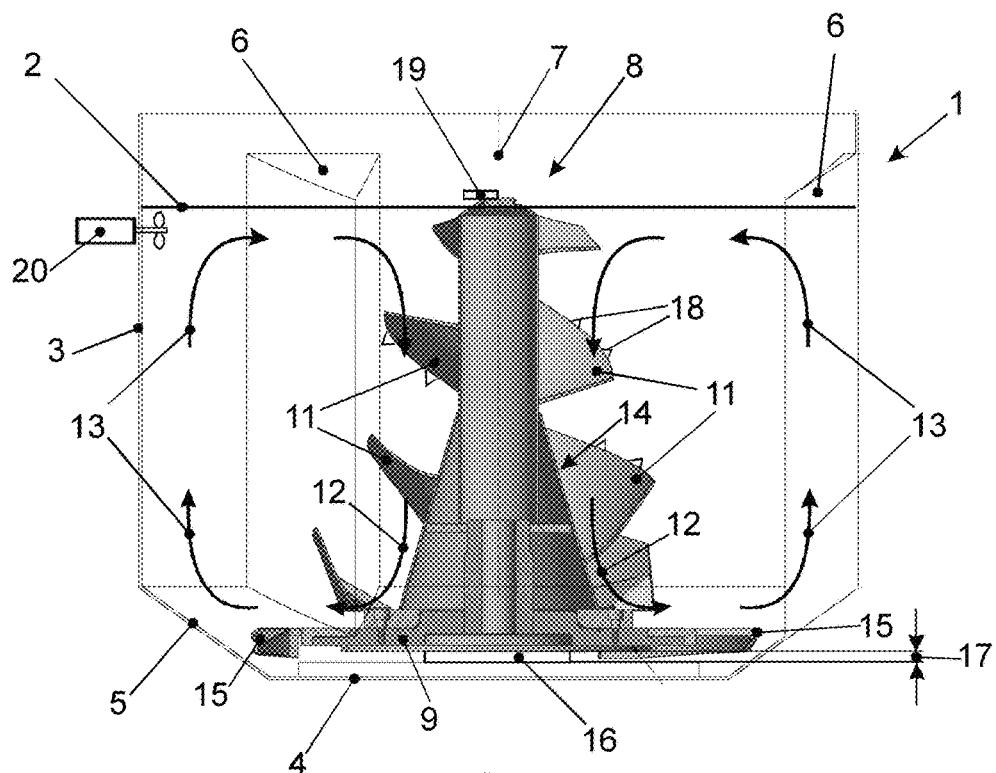
FIG. 1 shows a sectional side view of a high-concentration mixer.
Figure 2:
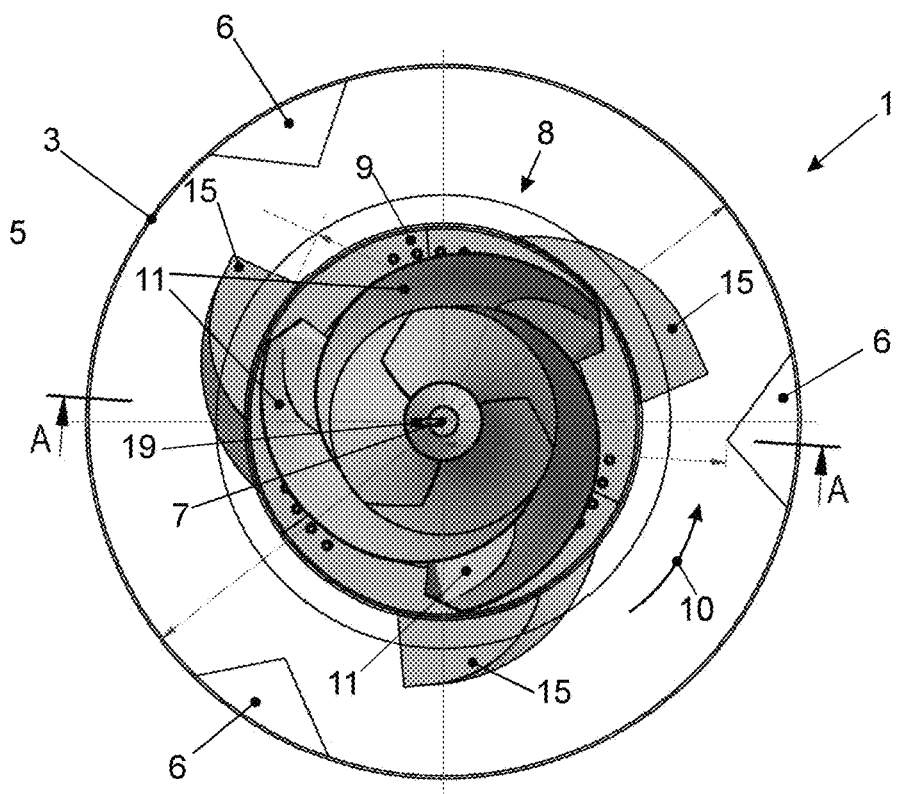
FIG. 2 shows a top view of the high-concentration mixer according to FIG. 1.

FIG. 1 shows a high-concentration mixer or, respectively, in abbreviated form a mixer 1 in a sectional side view A-A, and FIG. 2 shows a top view of the mixer 1. The mixer 1 is suitable for mixing different suspensions, but is particularly well suited for the preparation of a cellulose suspension, that is, a homogeneous suspension 2 of cellulose in an aqueous solution of a tertiary amine oxide, specifically N-methyl-morpholine-N-oxide (NMMO). The liquid level of the suspension 2 in a container 3 of the mixer 1 is shown in FIG. 1. The container 3 has a cylindrical design, with the container bottom 4 exhibiting chamfers 5. Flow breakers 6 on the container wall serve for a better blending of the suspension 2.

The mixer 1 comprises an agitator 8 arranged in a container axis 7, which agitator is connected to a motor not illustrated in the figures via a flange 9 provided in the region of the container bottom 4, which motor is designed for rotationally driving the agitator 8 for mixing the suspension 2 provided in the container 3. The motor drives the agitator 8 about its axis of rotation in a rotational direction 10. The agitator 8 has three helical coils 11 attached to the circumference of the axis of the agitator 8 in a rotationally symmetric way, which bring about a vertical downward flow 12 of the suspension 2 in the centre of the container 3 and a vertical upward flow 13 of the suspension 2 in the region of the container wall. The axis of the agitator 8 widens conically in the lower region 14, whereby the pressure in the downwardly flowing suspension 2 rises and the flow of the suspension 2 in the container 3 as described is enhanced further. The ratio of the diameter of the agitator 8 to the diameter of the container 3 is typically 0.4 to 0.8.

The flange 9 of the mixer 1 now has three blades 15 provided on its circumference, which are designed for wiping the suspension 2 from the container 3 and, in doing so, particularly for wiping the suspension 2 from the chamfer 5. Portions of the suspension 2 which are rather heavy or, respectively, viscous and, in this connection, in particular portions of the cellulose to be dissolved in the solvent NMMO are thereby reintroduced into the vertical upward flow 13 of the suspension 2 in the region of the container wall. In this way, those rather viscous or even solid parts are advantageously prevented from getting into the gap between the flange 9 and the container bottom 4 and from remaining therein, where they would increase the friction between the rotating flange 9 and the stationary container bottom 4.

In the mixer 1, furthermore, a spacer 16 is provided between the flange and the container bottom 4, whereby the gap, which otherwise is only very narrow, is widened to a width 17 which still causes insignificantly small frictional forces on the rotationally driven agitator 8 even if the cellulose suspension is viscous. The width 17 must be at least 20 mm and increases with the diameter of the agitator 8.

According to another exemplary embodiment of the invention, the spacer 16 might be omitted, but, instead, a flush connection could be installed in the container bottom 4 underneath the flange 9. In this exemplary embodiment, an aqueous solution, for example, NMMO, or a suspension would continuously be pumped during operation out of the representational container into the gap between the flange 9 and the container bottom 4 in order to make sure that no viscous cellulose suspension will deposit in the gap in a friction-increasing manner. Of course, the technical measures of the spacer 16 and the flush connection in the container bottom 4 could also be combined.

The pressure in the suspension 2 in the lower central region of the container 3 which has been increased by the axis of the agitator 8, which axis is widened conically in the lower region 14, is always highest at the place where the helical coils 11 of the rotor end on the flange 9. For this reason, it has proved to be advantageous to attach the blades 5 to the flange 9 exactly at those positions, as can be seen in FIG. 2. In this way, the entry of a relatively viscous suspension 2 into the gap between the flange 9 and the container bottom 4 is prevented particularly effectively, and the existing pressure energy is converted into a vertical upward flow on the container wall.

Furthermore, the mixer 1 now has prongs 18 at the free peripheral edge of the helical coil 11 for tearing up pulp parts contained in the suspension. The prongs could also be formed by recesses of the peripheral edge or by other shapes. In this way, a particularly high cellulose concentration can be achieved within a short period of time.

According to an application example, an 8% suspension 2 was initially produced from a spruce pulp and a 76% NMMO solution by means of an agitator without ripper teeth at the agitator. The suspension quality was poor, since pulp sheets collapsed and formed large lumps which failed to dissolve and, in addition, blocked the outlet during emptying. By equipping the agitator 8 with ripper teeth 18, the formation of lumps could be prevented effectively and the drawing of the pulp sheets into the suspension 2 could be improved.

Furthermore, the agitator 8 of the mixer 1 now has a scraper 19 at its end opposite to the flange 9, which scraper is designed for wiping off pulp parts of the suspension 2. When they are introduced, those pulp parts typically have a size of 60×80 cm or 75×100 cm and may stick to the agitator 8. However, it is also possible that pulp parts which already have dissolved or, respectively, been shredded partially deposit at the end of the agitator 8 which is located just above the liquid level. Only by providing the scraper 19, it is ensured that all pulp parts introduced into the container 3 will be dissolved in the suspension 2.

Furthermore, the mixer 1 comprises an auxiliary agitator 20 with a separate motor on the container wall for supporting the vertical downward flow 12 of the suspension 2 in the centre of the container 3 and the vertical upward flow 13 of the suspension 2 in the region of the container wall. By the auxiliary agitator 20, the flow is enhanced even further and the blending of the suspension 2 is accelerated. However, it is stated explicitly that the mixer will achieve the object according to the invention of producing a cellulose suspension in an aqueous NMMO solution having a cellulose concentration of more than 9% by weight and up to 15% by weight and more also without an auxiliary motor.

In an application example for the mixer 1, cellulose was introduced into the aqueous NMMO solution of 72% to 80% as a mixing partner in pieces of a size of 60×80 cm without pre-crushing in a dry state or with a moisture content of up to 50%. The agitator 8 was driven at 100 to 500 revolutions per minute, with the number of revolutions to be selected depending on the size of the container 3. The cellulose can be introduced into the mixer 1 also as rather large pulp sheets of 75×100 cm or even larger in order to obtain a homogeneous suspension 2 of cellulose in an aqueous solution of a tertiary amine oxide.

It may be mentioned that at least one of the blades can have a special form. The tip of this blade is not bent downwards in the rotational direction, whereas a baffle is mounted to the bottom side, which baffle presses the suspension accumulating underneath the blade against an outlet opening of the container, as the agitator rotates. This causes a very extensive evacuation of highly viscous suspension.

The distance from the end of a blade 15, as viewed in the rotational direction 10, to the beginning of the next blade 15 must be chosen large enough so that an exchange of the suspension 2 underneath the flange 9 is promoted. At least 30% of the circumference should be freed in this way.

Furthermore, it may be mentioned that the container wall can be heated. According to a further application example, a 12.7% suspension 2 was prepared from a short-fibre pulp and a 78% NMMO solution at a temperature of 75° C. At this temperature, the suspension is clearly more flowable, and the driving power on the agitator 8 is significantly smaller than with a temperature of the suspension 2 of 65° C. Already at 65° C., the suspension 2 achieved a very high stiffness.

The high-concentration mixer may be operated both discontinuously and continuously.

It may be mentioned that the agitator might also have alternative design variants with one or several helical coils. According to one design variant, the one helical coil does not run or several helical coils do not run as far as to the flange, but end(s) further up. Those helical coils generate only a vertical downward flow in the centre of the container, whereas one or several further helical coil(s) generate(s) a horizontal flow from the centre of the container to the container wall directly at the flange, whereby the vertical upward flow on the container wall is supported.

What is claimed is:

1. A high-concentration mixer for producing a homogeneous suspension of cellulose in an aqueous solution of a tertiary amine oxide, comprising a stationary container and an agitator arranged in a container axis, wherein the agitator is connected to a motor via a flange provided in the region of the container bottom, and the motor is designed for rotationally driving the agitator for mixing the suspension provided in the container,
   wherein the agitator has at least one helical coil which brings about a vertical downward flow of the suspension in the center of the container and a vertical upward flow of the suspension in the region of the container wall, and
   wherein the flange comprises at least one blade provided on and extending radially beyond its circumference, wherein said at least one blade is designed for wiping the suspension from the container and for supporting the vertical upward flow of the suspension in the region of the container wall, and a spacer is provided between the container bottom and the flange, wherein the spacer ensures a gap of a substantially consistent width between the container bottom and the flange.

2. The high-concentration mixer according to claim 1, wherein the container bottom comprises a flush connection via which an aqueous NMMO solution or a suspension can be withdrawn from the container.

3. The high-concentration mixer according to claim 1, wherein the at least one helical coil is mounted on the circumference of the axis of the agitator and ends on the flange, and wherein in each case, one of the blades is provided at the position or, respectively, at the positions where the one or several helical coil(s) end(s) on the flange.

4. The high-concentration mixer according to claim 3, wherein the free peripheral edge of the helical coil has prongs or ripper teeth for tearing up pulp parts contained in the suspension.

5. The high-concentration mixer according to claim 1, wherein the agitator has a scraper at its end opposite to the flange, and wherein the scraper is designed for wiping off pulp parts of the suspension.

6. The high-concentration mixer according to claim 1, wherein an auxiliary agitator with a separate motor is provided on the container wall for supporting the vertical downward flow of the suspension in the center of the container and the vertical upward flow of the suspension in the region of the container wall.

7. A method of using a high-concentration mixer according to claim 1, wherein cellulose is introduced into the aqueous NMMO solution of about 72% to 80% as a mixing partner in pulp pieces of a size of about 60×80 cm to about 75×100 cm without pre-crushing in a dry state or with a moisture content of up to 50% for the preparation of a homogeneous suspension.

8. The high-concentration mixer according to claim 1, wherein the container bottom comprises a flush connection via which an aqueous NMMO solution or a suspension can be introduced into the container by means of a pump.

9. The high-concentration mixer according to claim 2, wherein the aqueous NMMO solution or a suspension can be introduced into the container by means of a pump.

* * * * *